United States Patent
Strauss (10) Patent No.: US 10,322,511 B1
(45) Date of Patent: Jun. 18, 2019

(54) ROBOTIC FINGER SHAPE RECOVERY

(71) Applicant: X Development LLC, Mountain View, CA (US)

(72) Inventor: Marc Strauss, Fremont, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/833,200

(22) Filed: Dec. 6, 2017

(51) Int. Cl.
*B25J 15/12* (2006.01)
*B25J 15/00* (2006.01)

(52) U.S. Cl.
CPC ........... *B25J 15/0009* (2013.01); *B25J 15/12* (2013.01)

(58) Field of Classification Search
CPC .. B25J 15/0009; B25J 15/022; B25J 15/0233; B25J 15/12; Y10S 901/39
USPC .................................. 294/106, 111, 99.1
See application file for complete search history.

(56) References Cited

U.S. PATENT DOCUMENTS

| | | | |
|---|---|---|---|
| 2,545,452 A * | 3/1951 | Fletcher | A61F 2/586 623/64 |
| 3,640,564 A * | 2/1972 | Kuster | B25B 11/00 294/112 |
| 3,981,528 A * | 9/1976 | Andorf | B25J 15/0023 294/119.3 |
| 4,815,782 A * | 3/1989 | Craig | B25J 15/12 294/119.3 |
| 5,762,390 A * | 6/1998 | Gosselin | B25J 15/0009 294/106 |
| 8,550,519 B2 * | 10/2013 | Mankame | B25J 9/1085 294/86.4 |
| 2005/0218679 A1* | 10/2005 | Yokoyama | B25J 9/142 294/99.1 |
| 2012/0025553 A1* | 2/2012 | Fischer | B25J 15/022 294/198 |
| 2015/0032152 A1* | 1/2015 | Frings | A61B 17/282 606/207 |
| 2016/0375590 A1* | 12/2016 | Lessing | B25J 15/12 294/196 |

\* cited by examiner

*Primary Examiner* — Dean J Kramer
(74) *Attorney, Agent, or Firm* — McDonnell Boehnen Hulbert & Berghoff LLP (57) ABSTRACT

A robotic finger with a stiffening member is provided that includes a front facing member for gripping and a back end member that supports the front facing member. The front facing member is conformable about a target object and includes the stiffening member that alleviates bendset by returning the front facing member to an initial state when the front facing member is no longer conformed about the target object.

19 Claims, 8 Drawing Sheets

ROBOTIC FINGER SHAPE RECOVERY

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), enveloping, ingressive (such as a pin or needle), astrictive (such as a vacuum or suction element) or contigutive (requiring contact for adhesion, such as glue).

The embodiments disclosed herein may be implemented in the fingers disclosed by Strauss et al. in U.S. Pat. No. 9,533,419, which is incorporated by reference herein in its entirety.

SUMMARY

The present application discloses implementations that relate to a robotic finger with a stiffening member that recovers its shape after deformation.

In one example, a robotic finger includes a first member, a second member, and a plurality of linkages. The first member may include a plurality of rigid sections that are rotatably connected end-to-end through respective first joints. The second member may include a spine and a plurality of flexible sections along the spine that are connected end-to-end at respective second joints. The spine may include a substrate material and at least one stiffening member affixed to the substrate material. The may be spine configured to deform from an initial shape in response to an external force. The at least one stiffening member may be configured to return the spine to the initial shape upon removal of the external force. The plurality of linkages may connect the first member and the second member so as to align the plurality of flexible sections with the plurality of rigid sections side-by-side, and a respective linkage may connects a respective first joint of the first member to a respective second joint of the second member.

In another example, a deformable robotic finger element includes a spine formed at least in part from a substrate material, and at least one stiffening member affixed to the substrate material. The spine is configured to deform from an initial shape and conform about a target object. The at least one stiffening member is configured to return the spine to the initial shape when the robotic finger element is not conformed about a target object. The stiffening member may be an elastic solid material.

In another example, a robotic finger includes a first member, a second member, and a plurality of linkages. The first member may include a plurality of rigid sections that are rotatably connected end-to-end through respective first joints. The second member may include a spine and a plurality of flexible sections along the spine that are connected end-to-end at respective second joints. The spine may include a substrate material and at least one spring steel rod embedded in the substrate material. The may be spine configured to deform from an initial shape in response to an external force. The at least one spring steel rod may be configured to return the spine to the initial shape upon removal of the external force. The plurality of linkages may connect the first member and the second member so as to align the plurality of flexible sections with the plurality of rigid sections side-by-side, and a respective linkage may connects a respective first joint of the first member to a respective second joint of the second member.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

I. Overview

Robotic end effectors may be used in many situations to allow a robotic device to interact with an environment by pushing, pulling, grasping, holding, or otherwise interacting with one or more objects in the environment. For instance, a robotic device may include a robotic gripper having one or more fingers that can be actuated to change their shape, thereby allowing the robotic gripper to interact with the environment. Many grippers include two or more fingers that act to grasp an object in a pincer-like manner. Many of these types of grippers include fingers with multiple sections that may be controlled by multiple motors or actuators, similar to the structure of a human finger.

Example embodiments of robotic fingers described herein may include a first member and a second member, making up a back side member and a front facing (gripping) member of the finger, respectively. The back side member may have a plurality of rigid sections, rotatably connected end-to-end through respective first joints. The rigid sections may be a hard plastic, and the joints may be pin joints, allowing the rigid sections to rotate. The front facing member may have a plurality of flexible sections, connected end-to-end at respective second joints. The second joints may be pin joints or flexure joints, allowing the flexible sections to rotate at the connection points. The example robotic finger may also include a plurality of linkages connecting the back side member and the front facing member. The linkages may connect respective first joints with respective second joints, so as to align the plurality of flexible sections with the plurality of rigid sections side-by-side. In some examples, the number of rigid sections and flexible sections are the same, and the plurality of linkages connecting the respective first and second joints match up the respective sections of the first and front facing members. The example robotic finger may also include a fingertip section that connects a distal end the of back side member to a distal end of the front facing member. The fingertip section may include a compliant (e.g., rubber) tip, allowing the fingertip section to provide the finger with added grip. The fingertip section may also include a fingernail to aid in gripping small objects.

The back end and front facing members may include a plurality of rigid and flexible sections, respectively. In some examples, the first rigid and flexible sections connected to the fingertip section may be shorter than the second rigid and flexible sections respectively, which may be shorter than the third rigid and flexible sections, respectively. There may be a pattern in the lengths of the rigid and flexible sections such that the sections connected to the fingertip section are the short sections of the plurality, and each successive section farther from the fingertip section is increasingly longer, such that the longest rigid and flexible sections are located at the proximate end of the first and front facing members, respectively (i.e., the end furthest from the fingertip).

In some examples, each flexible section of the plurality of flexible sections may itself be made of a plurality of segments connected end to end. The plurality of segments may include, for example, an elastomer or flexible rubber, and arranged such that a string of segments are connected together to create each flexible section of the front facing member.

In other examples, the plurality of linkages connecting the back side member and the front facing member may be rotatably connected to the back side members and front facing members. Thus, two of the plurality of rigid sections may be rotatably connected at a first respective joint, and at the same joint, rotatably connected to a linkage, while the other side of that linkage is rotatably connected to a second respective joint, that also connects two of the plurality of flexible sections. In this way, the connections between the rigid sections, flexible sections, and linkages may be such that they allow for rotational movement, yet maintain a rigid structure under certain circumstances. Other variations are possible as well.

The front facing member of the finger may be subject to repeated or sustained deformation during gripping or long-duration contact with a surface, such as a floor. Such deformation activity may result in the front facing member exhibiting bendset, in which the front facing member retains an undesired deformed shape over an extended period of time and when not in contact with a target object or surface. This bendset can result in difficulty performing subsequent gripping operations during the duration of the bendset. To alleviate or eliminate the effects of bendset, example embodiments of the front facing member include one or more elastic stiffening elements. The stiffening element provides a bias force that returns the front facing member to its original shape after gripping or contact with a surface. In one example, a spring steel rod is included in the front facing member. In another example, two or more spring steel rods are included in the front facing member. In another example, one or more composite rods, such as aramid, fiberglass, or carbon fiber are included in the front facing member. In another example, the stiffening element is molded into the front facing member of the finger. In another example, flexible gripping sections are over-molded to a spine containing the elastic stiffening element.

II. Example Robotic Systems

Figure 1:
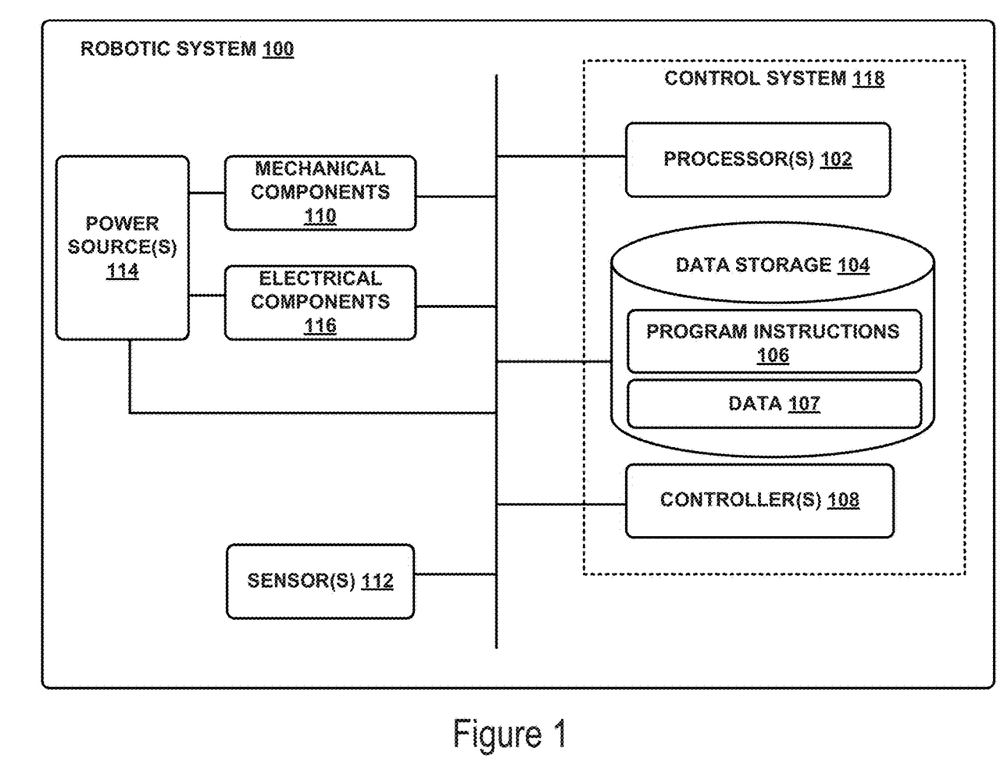
FIG. 1 illustrates a configuration of a robotic system, according to an example implementation.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a robotic arm, industrial robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. In some instances, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), wheel(s), hand(s), finger(s), feet, and/or end effectors. The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment. In another example, sensor(s) 112 may capture data corresponding to one or more characteristics of a target or identified object, such as a size, shape, profile, structure, or orientation of the object.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm, leg, hand, foot, or finger to measure the load on the actuators that move one or more members of the arm, leg, hand, foot, or finger. As another example, the robotic system 100 may use one or more position sensors to sense the position of the actuators of the robotic system. For instance, such position sensors may sense states of extension, retraction, positioning, or rotation of the actuators on arms, legs, hands, feet, fingers, or end effectors.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicitly discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, end effectors, gripping devices and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of the robotic system 100 are described below.

Figure 2:
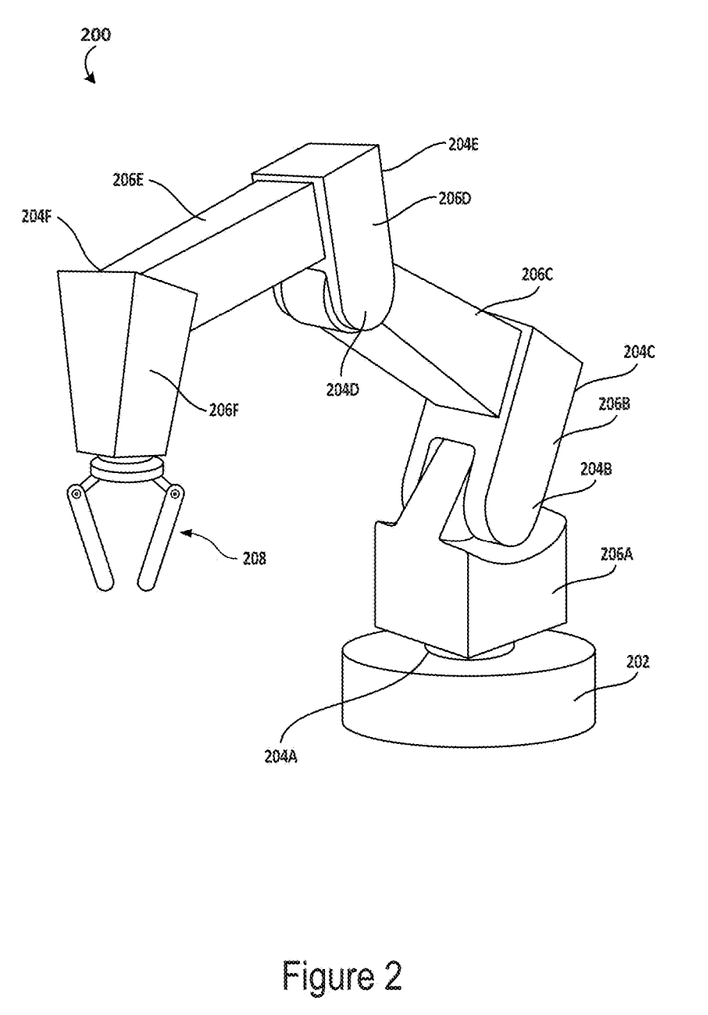
FIG. 2 illustrates an example robotic arm, according to an example implementation.

FIG. 2 shows an example robotic arm 200. As shown, the robotic arm 200 includes a base 202, which may be a stationary base or may be a movable base. In the case of a movable base, the base 202 may be considered as one of the mechanical components 110 and may include wheels (not shown), powered by one or more of actuators, which allow for mobility of the entire robotic arm 200.

Additionally, the robotic arm 200 includes joints 204A-204F each coupled to one or more actuators. The actuators in joints 204A-204F may operate to cause movement of various mechanical components 110 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the mechanical components 110, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

Figure 3A:
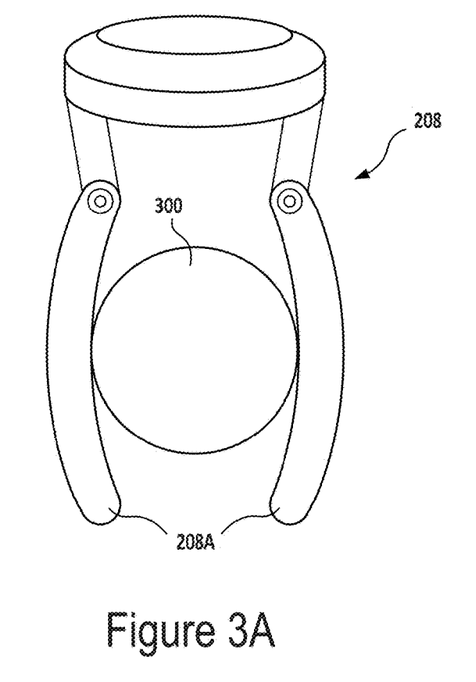
FIGS. 3A and 3B illustrate a robotic gripping device shown in FIG. 2, according to an example implementation.
Figure 3B:
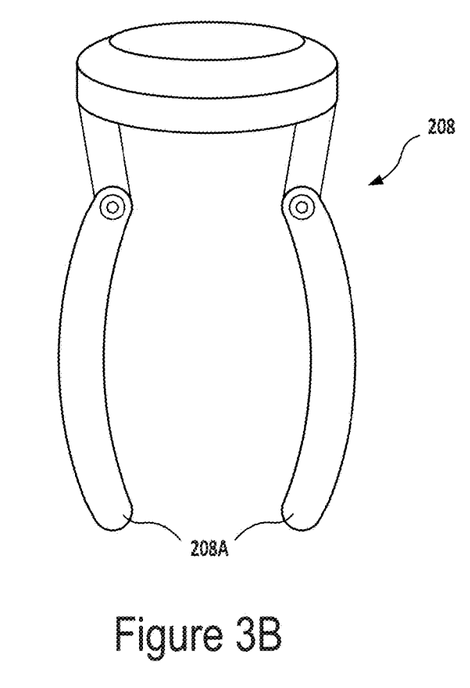

FIGS. 3A and 3B illustrate the occurrence of bendset in end effector 208, which is illustrated as a gripping finger device. In FIG. 3A, fingers 208A are illustrated gripping a round target 300 and conforming about it. During the gripping operation, the fingers 208A deform to a bent configuration from their initial straight configuration illustrated in FIG. 2. This deformation is not necessarily undesirable during the gripping operation, as it effectively conforms to, and secures, the round target 300. However, if the fingers 208A experience bendset and remain deformed after the target 300 is no longer being gripped, as illustrated in FIG. 3B, then that deformation is undesirable. The deformed fingers 208 in FIG. 3B may have difficulty picking up other target objects that, for example, require an initially straight finger shape as illustrated in FIG. 2.

III. Example Robotic Finger

Figure 4:
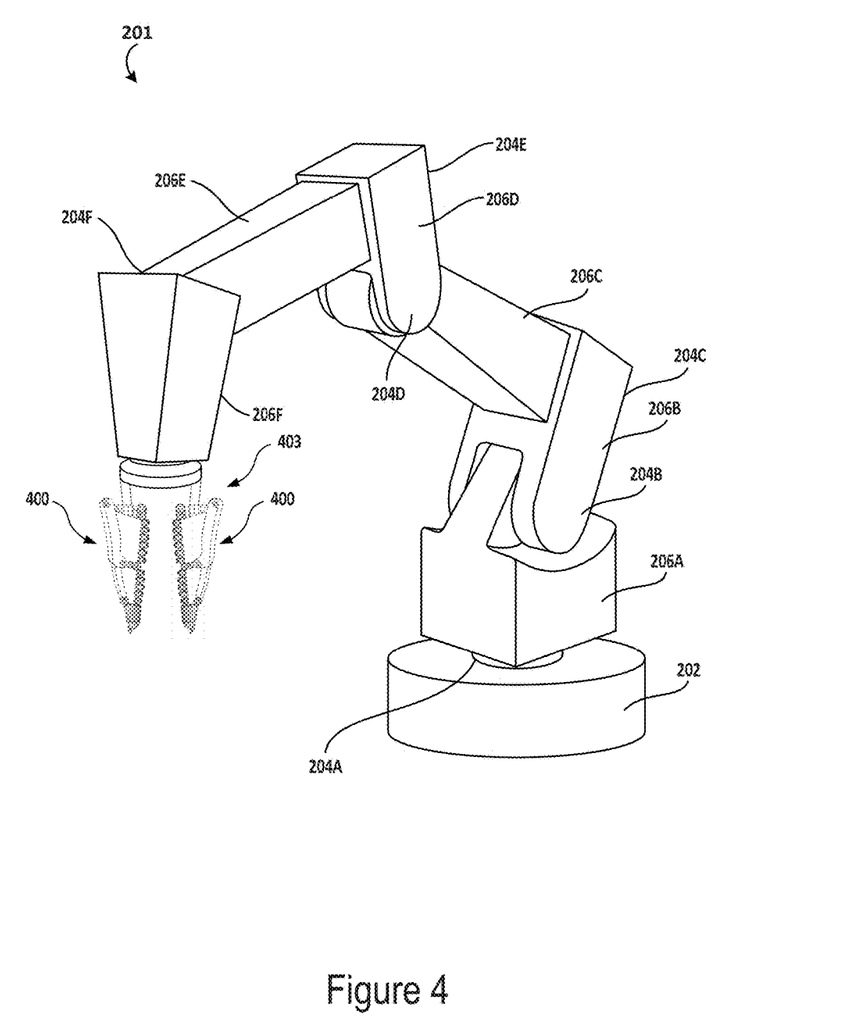
FIG. 4 illustrates an example robotic arm with an example robotic gripping device, according to an example implementation.

FIG. 4 shows an example robotic arm 201 and a robotic gripping device 403 with fingers 400. Robotic gripping device 403 may be implemented as a mechanical component of system 100 and/or robotic arm 200 or 201. Although the components illustrated in FIG. 4 are shown with a certain orientation and/or design, it should be understood that one or more components of robotic arm 201 and/or robotic gripping device 403 may be removed, added, and/or modified while remaining within the scope of this disclosure. Also, the orientation and combination of components may be changed based on the desired implementation.

Robotic gripping device 403 may include one or more physical components, including one or more fingers 400 and/or actuators. In some examples, robotic gripping device 403 may include two opposable fingers, as shown in FIG. 4. In other examples, more or fewer fingers may be included. Where three or more fingers are included, the fingers may be arranged in two groups opposing each other, such that when they are actuated they close toward each other. Two fingers may be positioned opposite the third, such that when the fingers close they interlock. In other examples, the fingers may be positioned or spaced evenly around a palm or base section. Other arrangements are possible as well.

Each finger 400 may be configured to move in a gripping direction, to contact, grasp, hold, grip, or otherwise interact with an object. In this disclosure, movement of the finger(s) may refer to rotation about one or more axes. For example, the base of each finger may be rotatably coupled along a respective axis to one or more other components of the robotic gripping device 403, and movement of each finger may include rotation of the fingers about the respective axes.

In other examples, movement of the fingers may include translational movement along an axis, such as movement in a clamping or sliding manner. The fingers may be coupled to one or more components of the robotic gripping device in a manner that allows them to maintain their orientation with respect to the gripping device (i.e., without rotating). For instance, a finger may move in a manner similar to how the components of a vice move, such that the plane created by the gripping surface of a finger remains fixed relative to the gripping device while movement of the fingers occurs. Or, the movement may be a combination of rotation and translation. Other types of movement are contemplated, with the above examples being included for description and to aid in understanding of the concepts involved herein. In all cases, the movement may cause each finger 400 to conform about the object.

The gripping surface of the fingers may be flexible and/or deformable, and may be a flexible plastic, rubber, or other compliant or non-compliant material suitable for gripping an object. As a result, movement of a finger may include deformation of the gripping surface and/or structure of the finger. For example, the finger may deform (e.g., bend, curve, distort, warp, stretch, or otherwise alter its shape) based on one or more factors, such as an impacting force or pressure. In an example embodiment, a two finger robotic gripping device such as the one shown in FIG. 4 may include an object placed at the midpoint of the fingers, as in FIG. 3A. When the fingers close on the object, the object may cause the fingers to conform around the object.

In some examples, the fingers may be under-actuated. Under-actuated fingers do not include an actuator for each phalanx of the finger, but instead have fewer actuators and cannot control each phalanx independently. A phalanx is a section of a finger. As an example, a typical human index finger includes three phalanges. One benefit of under-actuated fingers is that they can require less complex control systems and can be simpler to manufacture than fully actuated fingers. As noted above, a disadvantage of some under-actuated finger configurations is that they can be subject to bendset.

Figure 5:
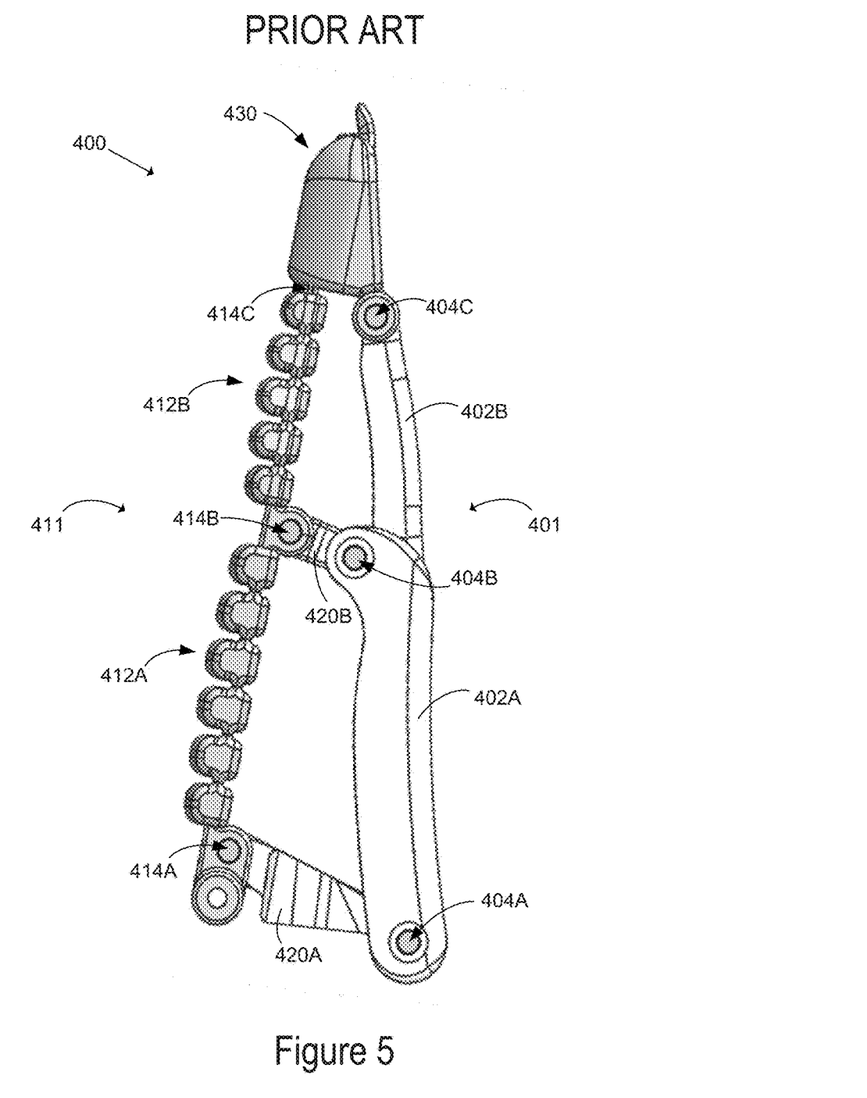
FIG. 5 illustrates an example robotic finger in which embodiments can be implemented.

FIG. 5 illustrates an example robotic finger 400 in which stiffening member embodiments can be implemented. Finger 400 may be implemented as a mechanical component 110 of system 100 and/or robotic arm 200 or 201. Although the components illustrated in FIG. 5 are shown with a certain orientation and/or design, it should be understood that one or more components of robotic finger 400 may be removed, added, and/or modified while remaining within the scope of this disclosure. Also, the orientation and combination of components may be changed based on the desired implementation.

Robotic finger 400 may generally include a finger with a rigid dorsal structure and a flexible ventral structure. The flexible ventral structure may have a tread or grippable surface that runs the length of the robotic finger. Robotic finger 400 may include a front facing member 411 as part or all of the flexible ventral structure and a back side member 401 as part or all of the rigid dorsal structure. Robotic finger 400 may also include a fingertip section 430 and a plurality of linkages 420A and 420B connecting back side member 401 and front facing member 411.

Back side member 401 may include a plurality of rigid sections 402A and 402B. Each rigid section may be shaped in, for example, a cylindrical or rectangular prism shape. For instance, the plurality of rigid sections shown in FIG. 5 each have a top end and a bottom end that are rounded, as well as an inside and an outside. The outside of the rigid sections may be rounded, as shown in FIG. 5.

The design of each rigid section may be similar, or may vary depending on the desired implementation. Referring to the outside of the plurality of rigid sections, in some examples there may be a slight curve while in other examples the outside of the plurality of rigid sections may be generally straight. Various other designs are possible as well. The specific design of the plurality of rigid sections may allow for easier and/or less expensive manufacturing, and/or may provide increased performance such as stronger grip, reduced complexity, survivability/robustness, weight reduction, or various other benefits.

In some implementations, the plurality of rigid sections may have a specific relationship to each other. For instance, where a back side member 401 includes two rigid sections, the first rigid section may be connected to a fingertip section and may be shorter than the second rigid section. In another example, where a back side member includes three rigid sections, the first rigid section may be connected to a fingertip section, and may be shorter than the second rigid section (i.e., a middle section), which may be shorter than the third rigid section. In this way, the back side member may have multiple rigid sections, where the shortest rigid section is connected to the fingertip section, and the rigid sections become progressively longer the further they are from the fingertip.

In some implementations, each rigid section may have a cavity that allows for rigid or flexible circuitry to be included. For example, the plurality of rigid sections may include one or more pressure, positional, or tactile sensors, which may provide a control system with information about the position, orientation, and grip strength of the robotic finger. The plurality of rigid section may provide increased protection for one or more included sensors or circuits as compared to flexible sections.

In some implementations, the plurality of rigid sections may be a hard plastic or metal. In other examples, composite materials or other types of materials may be used.

Back side member 401 may also include a plurality of first joints 404A, 404B, and 404C. First joints 404A, 404B, and 404C may be connected to rigid sections 402A and 402B at their respective ends. For instance, rigid section 402A may include a bottom and a top, and may include first joint 404A at the bottom and first joint 404B at the top. Similarly, rigid section 402B may include a bottom and a top, and may include first joint 404B at the bottom and first joint 404C at the top. Rigid sections 402A and 402B may thus be connected end to end via first joint 404B.

In some examples, first joints 404A, 404B and 404C may be pin joints. The first joints may allow rigid sections 402A and 402B to be rotatably connected, allowing the plurality of rigid sections to form a straight line, or to move out of line and form a bend or curve. In other examples, first joints 404A, 404B, and 404C may be pivot joints, rolling joints, flexure joints, or circular joints. Other types of joints are possible as well.

Front facing member 411 of robotic finger 400 may include a plurality of flexible sections 412A and 412B. Each flexible section of the plurality of flexible sections may be shaped in a cylindrical or rectangular prism shape. For instance, each of the plurality of flexible sections shown in FIG. 5 has a top end and a bottom end, as well as an inside and an outside, and has an elongated shape. The top and bottom of each of the plurality of flexible sections may include respective second joints. In some examples, the plurality of flexible sections may be connected end-to-end at respective second joints. The outside of the plurality of flexible sections may be configured to grip an object.

The design of each flexible section may be the same, or may vary depending on the desired implementation. In some examples, each flexible section may be straight when in an initial state while, in other examples, each flexible section may be curved or bent in an initial state. Various other designs are possible as well. The specific design of the plurality of flexible sections may allow for easier and/or less expensive manufacturing, and/or may provide increased performance such as a stronger grip, reduced complexity, reduced slippage of an object in the finger's grasp, increased points of contact with an object, and/or other benefits.

In some implementations, the plurality of flexible sections may have a specific relationship to each other. For instance, where a front facing member 411 includes two flexible sections, the first flexible section may be connected to a fingertip section and may be shorter than the second flexible section. In another example, where a front facing member includes three flexible sections, the first flexible section may be connected to a fingertip section, and may be shorter than the second flexible section (i.e., a middle section), which may be shorter than the third flexible section. In this way, the front facing member may have multiple flexible sections, where the shortest flexible section is connected to the fingertip section, and the flexible sections become progressively longer the further they are from the fingertip.

In some implementations, each flexible section may have a cavity that allows for rigid or flexible circuitry to be included. For example, the plurality of flexible sections may include one or more pressure, positional, or tactile sensors, which may provide a control system with information about the position, orientation, and grip strength of the robotic finger. In other implementations, flexible circuitry may be included on an outside or gripping side of one or more flexible sections of the plurality of flexible sections.

In some implementations, the plurality of flexible sections may be made from elastomer, rubber, polyurethane, or another flexible material, such that each flexible section may be able to deform from an initial state. In other examples, composite materials or other types of materials may be used.

In some examples, each of the plurality of flexible sections 412A and 412B may have a design or structure that allows the flexible section to bend, twist, deform, curve, or otherwise change its shape. For instance, a flexible section may include an accordion design such that it can expand and contract along an axis that connects the flexible section end-to-end with one or more other flexible sections. In other examples, a flexible section may include a plurality of segments. The plurality of segments may be shaped like teeth, and each segment may have one or more bend points. The plurality of segments may be connected end-to-end to form a flexible section. In some examples, the plurality of segments may be rounded, and/or may be shaped to grip an object.

In some examples, the plurality of flexible sections and/or plurality of segments of a flexible section may be made of an elastomer, rubber, foam, or another material. The plurality of segments may be connected end-to-end via a midpoint or central portion of each segment, and may include a small gap between each segment such that plurality of segments combined into the flexible section can bend into a curved shaped when pressure is applied to the flexible section. In some examples, the plurality of segments may be configured such that they bend into a curve when pressure is applied only along the plane including the finger. As such, the plurality of segments may maintain a linear relationship, and/or may not deform when a pressure is applied to a side (i.e., not a front face) of the plurality of segments. The plurality of segments may be configured to only bend in a single plane.

Front facing member 411 may also include a plurality of second joints 414A, 414B, and 414C. Second joints 414A, 414B, and 414C may be connected to flexible sections 412A and 412B at their respective ends. For instance, flexible section 412A may include a bottom and a top, and may include second joint 414A at the bottom and second joint 414B at the top. Similarly, flexible section 412B may include a bottom and a top, and may include second joint 414B at the bottom and first joint 414C at the top. Flexible sections 412A and 412B may thus be connected end-to-end via second joint 414B. In other embodiments, flexible sections 412A and 412B may be connected end-to-end independently from second joint 414B (i.e., via a static joint forming a single flexible piece), and second joint 414B may be connected to the single flexible piece at the point where flexible section 412A connects to flexible section 412B (i.e., at the static joint).

In some examples, second joints 414A and 414B may be pin joints, as shown in FIG. 5. The second joints may allow flexible sections 412A and 412B to be rotatably connected, allowing the plurality of flexible sections to form a straight line or to move out of line and form a bend or curve. In other examples, second joints 414A and 414B may be pivot joints or circular joints. Second joint 414C may include a static joint connecting flexible section 412B and fingertip section 430, such that flexible section 412B does not rotate with respect to fingertip section 430. Flexible section 412B and fingertip section 430 may thus maintain a linear relationship.

Alternatively, second joint 414C may be a flexure joint. Other types of joints are possible as well.

Robotic finger 400 in FIG. 5 may also include a plurality of linkages 420A and 420B. Linkages 420A and 420B may connect back side member 401 to front facing member 411 so as to align the plurality of rigid sections with the plurality of flexible sections side-by-side. The linkages may align the plurality of rigid sections with the plurality of flexible sections such that a first respective rigid and flexible section are non-parallel to each other, and a second respective rigid and flexible section are non-parallel to each other, as shown in FIG. 5 with reference to rigid sections 402A and 402B, and flexible sections 412A and 412B. Alternatively, one or more of the respective rigid and flexible sections may be parallel to each other. Each of the plurality of linkages may be rectangular in shape, and/or may have one or more bends, curves, notches, or other structural characteristics. The plurality of linkages may be the same material as the plurality of rigid sections (i.e., a hard plastic, metal, or other material) or may be another type of material.

In some implementations, linkages 420A and 420B may include respective front facing sides and back sides, with joints on each side. The back side of a respective linkage may include a respective first joint, and the front facing side of a respective linkage may include a respective second joint. Shown in FIG. 5, linkage 420A includes first joint 404A on the back side, and includes second joint 414A on the front facing side. Similarly, linkage 420B includes first joint 404B on the back side and second joint 414B on the front facing side. In this manner, the plurality of linkages connect respective first and second joints of the back side member and front facing member, such that the plurality of rigid sections and flexible sections are aligned.

In some examples, the linkages may include pin joints, as shown in FIG. 5. Pin joints may allow the linkages to by rotatably connected to respective rigid sections and flexible sections. In other examples, the linkages may include static joints, rolling joints, flexure joints, or other types of joints. In still other examples, the linkages may include one type of joint on the front facing side, and another type of joint on the back side.

In some examples, the plurality of rigid sections and plurality of flexible sections may be aligned such that a first rigid section and a first flexible section are both connected to a fingertip section of a robotic finger, forming a nearly parallel relationship. In the embodiment shown in FIG. 5, the relationship between a respective rigid section and a respective flexible section may also form a generally trapezoidal shape, such that the top of a rigid section and top of a flexible section is closer than the bottom of the same rigid and flexible sections. A second rigid section and a second flexible section, connected end-to-end with respective first rigid section and flexible section, may also be roughly trapezoidal (or generally parallel) to each other. The respective rigid sections and flexible sections may be connected a plurality of linkages, such that the roughly trapezoidal (or generally parallel) relationship is maintained.

In some implementations, linkages in the plurality of linkages may be a given length based on a relationship between the plurality of linkages. For instance, a first linkage connecting the rigid and flexible sections that are connected to the fingertip section may be shorter than a linkage connecting the second rigid and flexible sections. As a result, a roughly trapezoidal alignment is formed by the plurality of rigid sections, plurality of flexible sections, and plurality of linkages.

Robotic finger 400 in FIG. 5 may also include a fingertip section 430. Fingertip section 430 may be connected to a distal end of back side member 401 by a respective first joint 404C, and connected to a distal end of front facing member 411 by a respective second joint 414C. Fingertip section 430 may include rubber, and/or another material suited for gripping one or more objects. Fingertip section 430 may also include one or more sensors, such as a pressure, positional, or tactile sensor, which may provide a control system with information about the position, orientation, and grip strength of the robotic finger. In some embodiments, fingertip section 430 may an integral element of front facing member 411.

In some implementations, the structure and orientation of the elements of the robotic finger (plurality of linkages, rigid sections, flexible sections, and fingertip section) is such that a stable initial state is formed, such as that shown in FIG. 5. This initial state may be an equilibrium, such that when the finger 400 is forced out of the initial state by an impacting force, removing the impacting force causes the robotic finger 400 to return to the initial state. However, in some cases, bendset can result from the impacting force and the robotic finger 400 will not return to the initial state, or will return so slowly as to be impractical for repetitive use.

IV. Example Stiffening Member in Robotic Finger

Figure 6A:
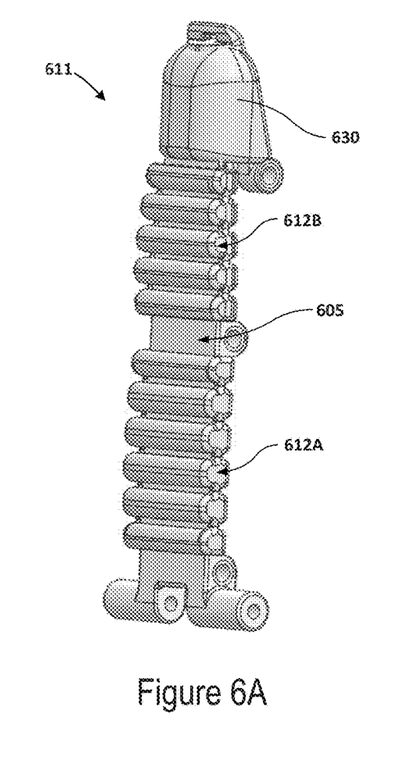
FIG. 6A illustrates an example front facing member, according to an example implementation.
Figure 6B:
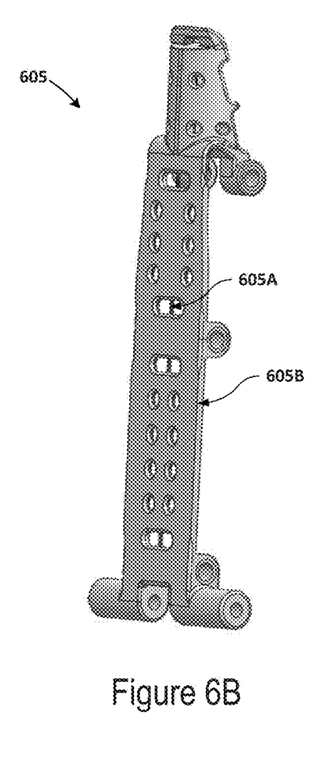
FIG. 6B illustrates an example spine of the front facing member in FIG. 6A, according to an example implementation.

FIG. 6A illustrates a front facing member 611 which may be implemented in the example robotic finger 400 in FIG. 5, according to an example implementation. In one embodiment, front facing member 611 includes a flexible spine 605 on which flexible sections 612A and 612B and fingertip section 630 may be over-molded with a compliant material (e.g., elastomer, rubber, plastic, or polyurethane). FIG. 6B illustrates spine 605 without the over-molded flexible sections 412A and 412B and without the overmolded fingertip section 630. Spine 605 may be formed at least in part from an elastic substrate material 605B (e.g., plastic) that can deform and return to its initial state. However, the elastic substrate material 605B may suffer from bendset when the front facing member 611, is, for example, repeatedly used to grip a particular target object shape, or if the front facing member 611 is left in contact with a surface for an extended period of time, such as when a robotic arm 201 sags into a floor overnight. To mitigate or eliminate any bendset, spine 605 further includes a restorative elastic stiffening member 605A.

Figure 6C:
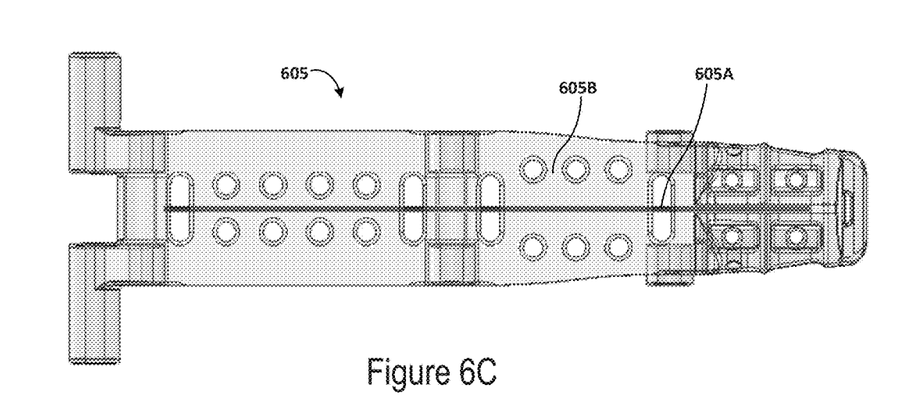
FIG. 6C illustrates a top view of the spine in FIG. 6B, according to an example implementation.
Figure 6D:
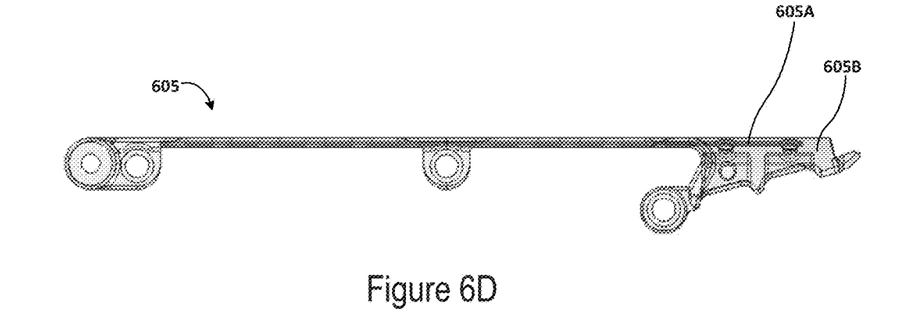
FIG. 6D illustrates a side view of the spine in FIG. 6B, according to an example implementation.

FIGS. 6C and 6D illustrate one embodiment of a restorative elastic stiffening member 605A implemented in a spine. In the illustrated embodiment, the stiffening member 605A is a rod embedded in the elastic substrate material 605B of flexible spine 605. Preferably, the stiffening member 605A is a cylindrical spring steel rod. In alternative embodiments, a composite rod, such as aramid, fiberglass, or carbon fiber is used as a stiffening member. In other embodiments, a stiffening member has a non-circular cross-section.

Preferably, the stiffening member 605A extends the length of both flexible sections 612A and 612B and into the fingertip section. As illustrated, preferably, the stiffening member 605 is encapsulated by the substrate material 605B along substantially the length of the stiffening member 605. Encapsulation reduces the chance of the stiffening member 605A separating from the substrate material 605B when it applies a restorative bias force to return a deformed front facing member 611 to its initial state. Alternatively, the stiffening member 605A may be adhered or mechanically fastened to the substrate material 605B. In one embodiment, the stiffening member 605A may be co-molded with the substrate material 605B. In another embodiment, the stiffening member 605A may be inserted into receptacles (e.g., channels, grooves, tabs, etc.) in the substrate material 605B after molding or forming of the substrate material 605B.

As illustrated, the front facing member 611, (and correspondingly, the spine 605) has an initial planar state. In such a configuration, the stiffening member 605A is correspondingly linear. However, other initial states are contemplated and an initial state of a spine (and correspondingly, a front facing member) may be curved or another shape. In such embodiments, a stiffening member may be correspondingly shaped to match the initial state. In all cases, a stiffening member should not substantially detract from the ability of the the front facing member to deform (e.g., bend, curve, distort, warp, stretch, or otherwise alter its shape) during normal operations (e.g., conforming around an object during a grasping operation). The relative stiffness of the stiffening member may be low compared to the spine, but the stiffening member's ability to provide a persistent restorative force back to its initial state mitigates bendset in the spine and front facing member.

Figure 7:
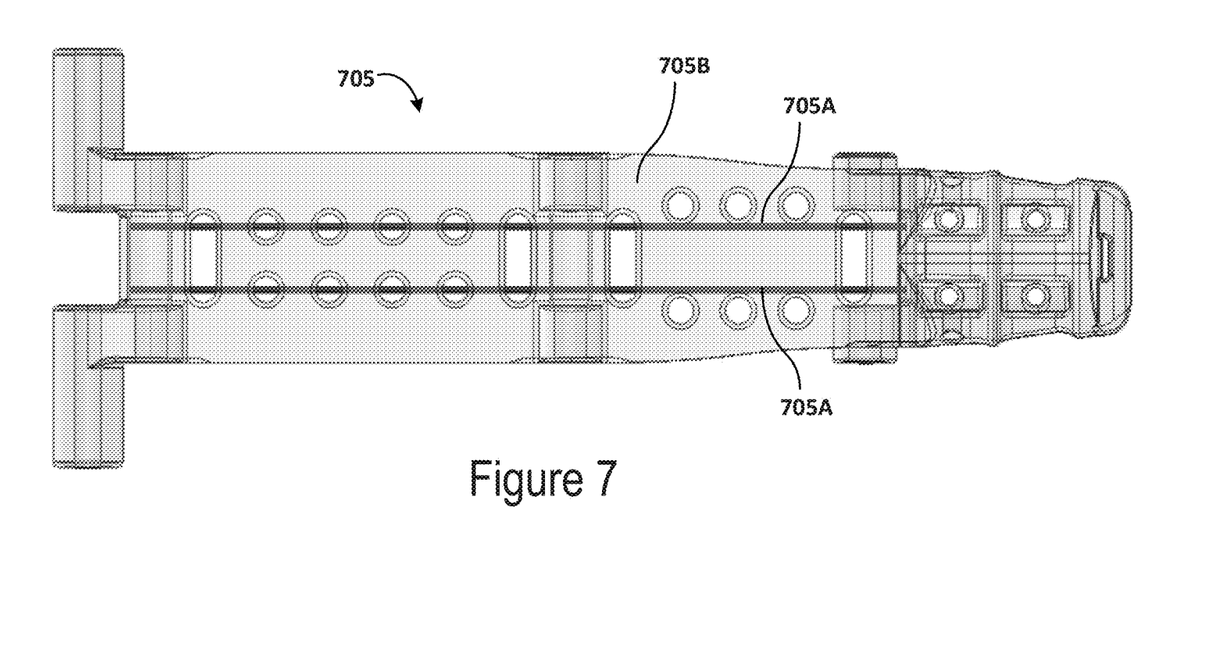
FIG. 7 illustrates an alternative implementation of an example spine of the front facing member in FIG. 6A, according to an example implementation.

FIG. 7 illustrates another alternative embodiment of a spine that can be implemented in the front facing member 611. Spine 705 includes two stiffening members 705A embedded in substrate material 705B. Each of the stiffening members 705A extend the length of both flexible sections, but do not extend substantially into the fingertip section; though in another embodiment, each of the stiffening members 705A may extend into the fingertip section. Varying the length of the stiffening member(s) can change the flexibility and restoration characteristics of the front facing member 611. Including more than one stiffening member in a spine can reduce the required cross-section (e.g., diameter) of each stiffening member and allow thinner spines and/or more encapsulation material around the stiffening members.

V. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

The invention claimed is:
1. A robotic finger comprising:
   a first member comprising a plurality of rigid sections that are rotatably connected end-to-end through respective first joints;

a second member comprising:
  a spine comprising a substrate material and at least one stiffening member affixed to the substrate material, wherein the spine is configured to deform from an initial shape in response to an external force, and wherein the at least one stiffening member is configured to return the spine to the initial shape upon removal of the external force, and
  a plurality of flexible sections along the spine that are connected end-to-end at respective second joints; and
a plurality of linkages connecting the first member and the second member so as to align the plurality of flexible sections with the plurality of rigid sections side-by-side, wherein a respective linkage connects a respective first joint of the first member to a respective second joint of the second member.

2. The robotic finger of claim 1, further comprising a fingertip section that connects a distal end the first member to a distal end of the second member.

3. The robotic finger of claim 1, wherein each of the plurality of flexible sections comprises a plurality of segments connected end-to-end.

4. The robotic finger of claim 1, wherein the plurality of linkages connecting the first member and the second member comprises:
  a first linkage connecting a proximate end of the first member to a proximate end of the second member; and
  a second linkage connecting a central part of the first member to a central part of the second member, wherein the second linkage is shorter than the first linkage.

5. The robotic finger of claim 1, wherein the at least one stiffening member comprises an elastic rod.

6. The robotic finger of claim 1, wherein the at least one stiffening member comprises spring steel.

7. The robotic finger of claim 1, wherein the at least one stiffening member comprises a composite material.

8. The robotic finger of claim 1, wherein the at least one stiffening member is encapsulated within the spine.

9. The robotic finger of claim 8, wherein each of the plurality of flexible sections comprises a material over-molded onto the substrate material.

10. The robotic finger of claim 1, wherein the at least one stiffening member is inserted into the spine.

11. The robotic finger of claim 1, wherein the at least one stiffening member is affixed onto the substrate material.

12. The robotic finger of claim 1, wherein the at least one stiffening member comprises at least two stiffening members.

13. A deformable robotic finger element comprising:
  a spine comprising a substrate material and at least one stiffening member affixed to the substrate material, wherein the spine is configured to deform from an initial shape and conform about a target object, wherein the at least one stiffening member is configured to return the spine to the initial shape when the deformable robotic finger element is not conformed about a target object, and
  wherein the stiffening member is an elastic solid material, the deformable robotic finger element further comprising a compliant material over-molded onto the spine such that the compliant material extends from one end of the spine to an opposite end of the spine.

14. The deformable robotic finger element of claim 13, wherein the at least one stiffening member comprises spring steel.

15. The deformable robotic finger element of claim 13, wherein the at least one stiffening member comprises a composite material.

16. The deformable robotic finger element of claim 13, wherein the at least one stiffening member is encapsulated within the spine.

17. The deformable robotic finger element of claim 13, wherein the at least one stiffening member is inserted into the spine.

18. The deformable robotic finger element of claim 13, wherein the at least one stiffening member is affixed onto the spine.

19. A robotic finger comprising:
  a first member comprising a plurality of rigid sections that are rotatably connected end-to-end through respective first joints;
  a second member comprising:
    a spine comprising a substrate material and at least one spring steel rod embedded in the substrate material, wherein the spine is configured to deform from an initial shape in response to an external force, and wherein the at least one spring steel rod is configured to return the spine to the initial shape upon removal of the external force, and
    a plurality of flexible sections along the spine that are connected end-to-end at respective second joints, wherein each of the plurality of flexible sections comprise a material over-molded onto the substrate material; and
  a plurality of linkages connecting the first member and the second member so as to align the plurality of flexible sections with the plurality of rigid sections side-by-side, wherein a respective linkage connects a respective first joint of the first member to a respective second joint of the second member.

* * * * *